(12) United States Patent
Chen

(10) Patent No.: US 6,249,646 B1
(45) Date of Patent: Jun. 19, 2001

(54) REUSABLE PHOTOGRAPHIC FILM PACKAGE FOR A CAMERA

(76) Inventor: Jui-Lin Chen, 10F, No.359, Der Ho Road, Yung Ho City, Taipei, 234 (TW)

( * ) Notice: Subject to any disclaimer, the term of this patent is extended or adjusted under 35 U.S.C. 154(b) by 0 days.

(21) Appl. No.: 09/495,387

(22) Filed: Feb. 1, 2000

(51) Int. Cl.[7] .............................. G03B 17/02; G03B 17/26
(52) U.S. Cl. ............................ 396/6; 396/440; 396/511; 396/538
(58) Field of Search ........................ 396/6, 439, 440, 396/511, 512, 513, 515, 516, 535, 538

(56) References Cited

U.S. PATENT DOCUMENTS

| | | | |
|---|---|---|---|
| 1,944,312 | * | 1/1934 | Black ..................................... 396/538 |
| 2,933,027 | * | 4/1960 | Hollingworth et al. ............. 396/538 |
| 4,290,680 | * | 9/1981 | Muramatsu et al. ................. 396/442 |
| 5,040,010 | * | 8/1991 | Arai ..................................... 396/538 |

* cited by examiner

Primary Examiner—David M. Gray
(74) Attorney, Agent, or Firm—Dougherty & Troxell

(57) ABSTRACT

A photographic film package with film container holding chamber for a camera is disclosed. The film package includes a light-tight casing having an exposure opening, and a film container holding chamber formed on one side of the exposure opening in the light-tight casing for holding a film container, and a film winding chamber formed on the other side of the exposure opening. The film container holding chamber includes two opposite plates defining a C-shaped clipping structure and an axially-extending side opening through which a film container is inserted into the C-shaped clipping structure to be substantially surrounded thereby. The film container holding chamber further comprises an upper supporting plate formed on the upper section of the film container holding chamber, and a lower supporting plate formed on the lower section of the film container holding chamber.

4 Claims, 4 Drawing Sheets

REUSABLE PHOTOGRAPHIC FILM PACKAGE FOR A CAMERA

BACKGROUND OF THE INVENTION

1. Field of the Invention

The present invention relates to a photographic film package for a lens-fitted photographic camera, and more particularly to a photographic film package with a reloadable film container holding chamber for holding a film container therein.

2. Description of the Prior Art

Lens-fitted photographic film packages or cassettes are now on the market. These prior art photographic film packages are single-use and low-cost camera preloaded with photographic film therein. These film packages make it possible to take pictures whenever desired without buying or carrying an expensive and heavy camera. Examples of such prior art photographic film packages are disclosed in U.S. Pat. Nos. 5,408,288, 4,954,857, 5,436,685, 4,972,649, 4,884,087, 5,063,400, and 4,855,774.

For example, the photographic film package as disclosed in U.S. Pat. No. 4,884,087 has a film housing of which a front cover and a rear cover are secured to a main assembly, in which assembly an optical lens, a film wind-up wheel, a shutter mechanism and a wind-up stopping mechanism are incorporated.

The structure of the prior art film package includes a film supplying chamber and a film take-up chamber formed on opposite horizontal sides of the optical lens. The unexposed film is wound in a roll and contained in the film supplying chamber. A user who has purchased the film unit winds up the film frame by frame at each exposure on a spool in a cassette contained in the film take-up chamber. The film unit in its entirety is forwarded to a photo laboratory when the whole strip of the film is exposed. The film package needs to be unloaded in a dark room and the film package after processing will be destroyed and discarded as waste. It is noted that the destroyed film package will cause damage to the environment, so that it is desirable to be able to recycle the film package after processing and reload a new film container therein.

SUMMARY OF THE INVENTION

It is therefore a primary object of the present invention to provide a recycled photographic film package for a photographic camera.

The other object of the present invention is to provide a photographic film package with a film container holding chamber for holding a reloaded film container therein. The photographic film package may be preloaded with a film container therein for first use. After the whole strip of the film contained in the film container is exposed, it is possible to recycle the photographic film container by simply reloading a new film container.

In order to achieve the above objects above, the photographic film package with a film container holding chamber in accordance with a preferred embodiment of the present invention includes a light-tight casing having an exposure opening, and a film container holding chamber formed on one side of the exposure opening in the light-tight casing for holding a film container, and a film winding chamber formed on the other side of the exposure opening. The film container holding chamber includes two opposite plates defining a C-shaped clipping structure and an axially-extending side opening through which a film container is inserted into the C-shaped clipping structure to be substantially surrounded thereby.

Preferably, the film container holding chamber further comprises an upper supporting plate formed on the upper section of the film container holding chamber, and a lower supporting plate formed on the lower section of the film container holding chamber.

BRIEF DESCRIPTION OF THE DRAWINGS

The above and other objects and features of the present invention will become apparent from the following detailed description taken in conjunction with the preferred embodiments thereof with reference to the accompanying drawings in which like parts are designated by like numerals throughout the views of the drawings and wherein.

DETAILED DESCRIPTION OF THE PREFERRED EMBODIMENTS

Figure 1:
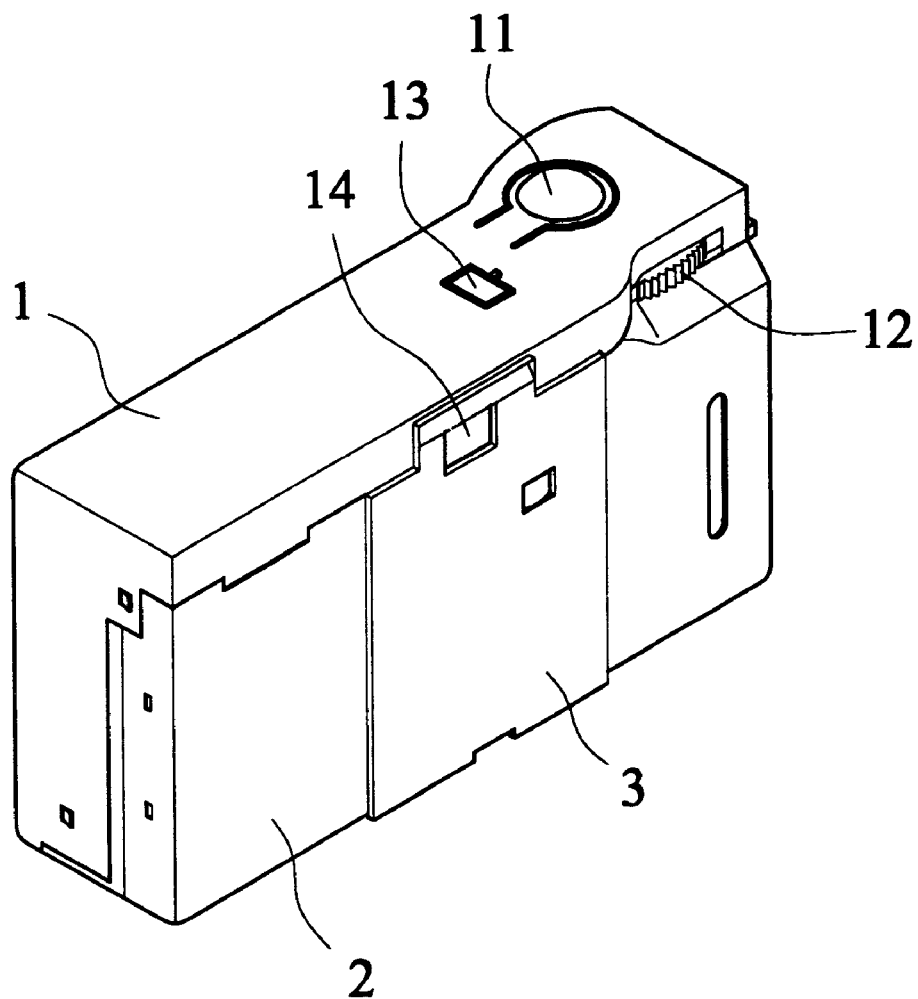
FIG. 1 is a rear perspective view of the lens-fitted photographic film package of one embodiment of the present invention.

Referring now to FIG. 1, there is shown a photographic film package of a preferred embodiment of the present invention. The lens-fitted photographic camera mainly comprises a main casing 1, a film package casing 2, and a locking member 3.

The main casing 1 is formed with an inner space therein for receiving a known optical lens and necessary photographic components such as shutter mechanism therein. The optical lens is mounted on the front portion thereof (not shown).

Figure 2:
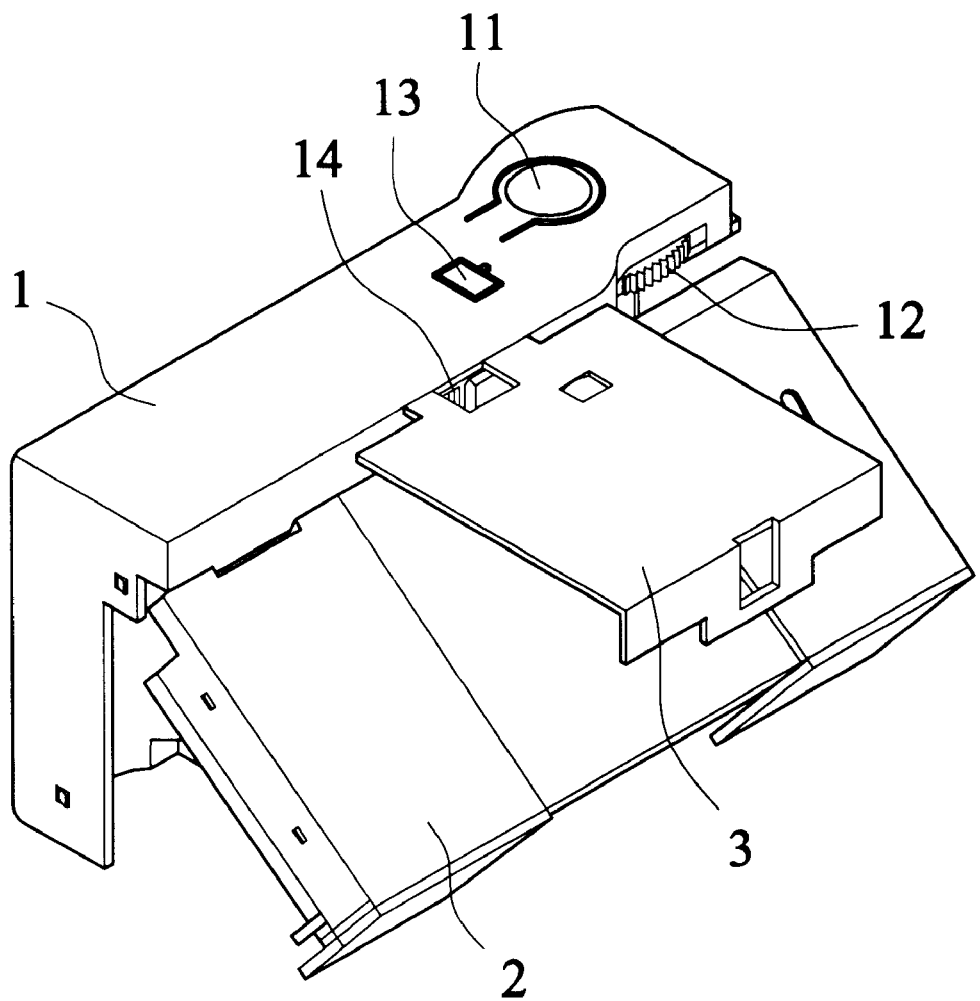
FIG. 2 is a rear perspective view of the lens-fitted photographic film package of one embodiment of the present invention, showing the film package casing and locking member are separated from the main casing.

The main casing 1 is provided with a shutter actuating button 11, a film advancing knob 12, a film counter window 13, and a finder window 14. A receptacle chamber is formed on the back portion of the main casing 1 for receiving the film package casing 2 with a structure corresponding to the receptacle chamber of the main casing 1. The film package casing 2 may be attached onto the rear receptacle chamber of the main casing 1, and then locked by the locking member 3, as shown in FIG. 1. The film package casing 2 may be taken out from the receptacle chamber of the main casing 1 by simply unlocking the locking member 3, with reference to FIG. 2.

Figure 3:
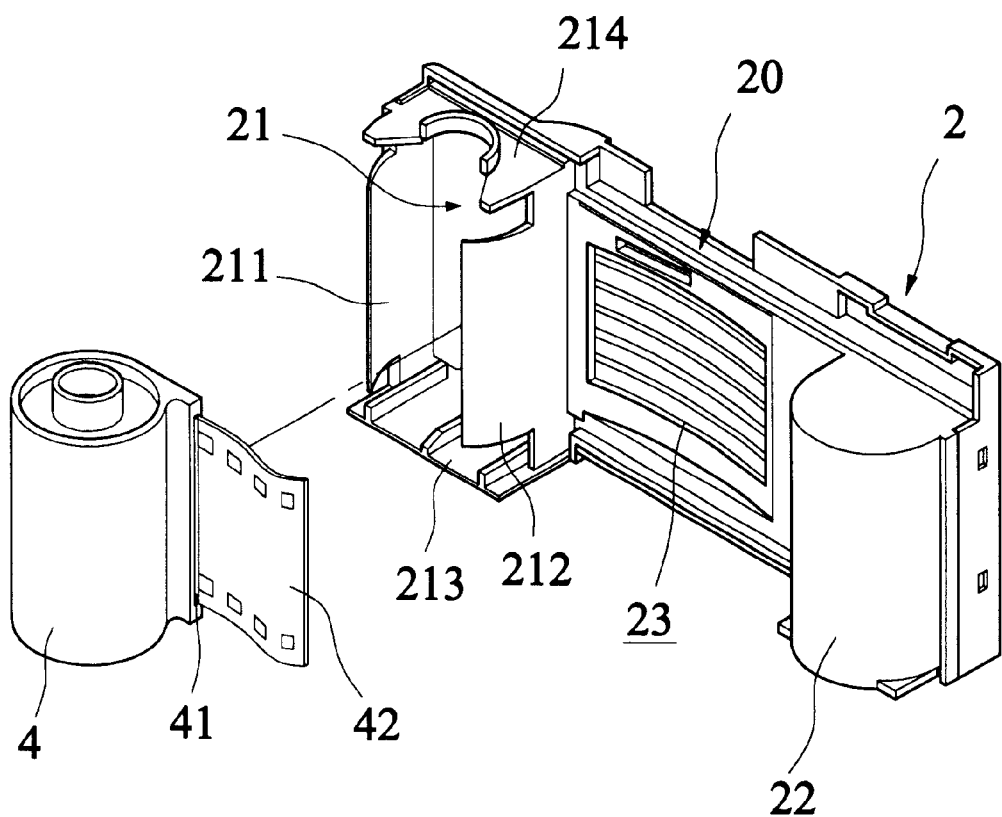
FIG. 3 is a perspective view showing a film container is removed from a film container holding chamber of the film package casing.
Figure 4:
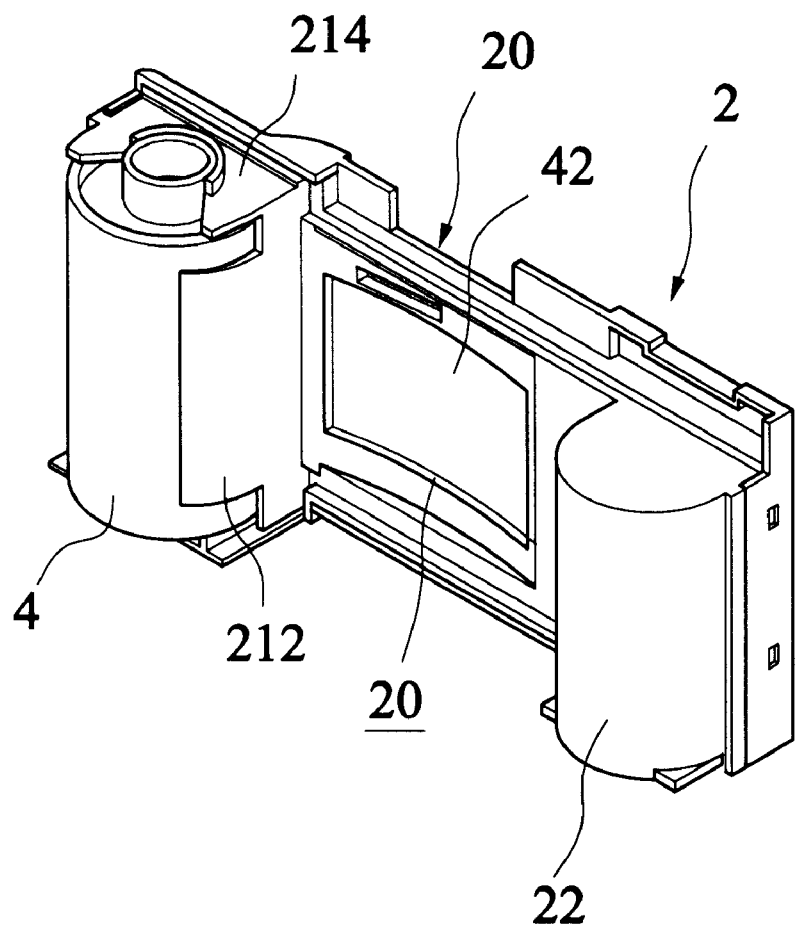
FIG. 4 is a perspective view showing a film container is contained in a film container holding chamber of the film package casing.

FIG. 3 is a perspective view showing a film container 4 removed from a film container holding chamber 21 formed in the film package casing 2, and FIG. 4 is a perspective view showing the film container 4 received in the film container holding chamber 21 of the film package casing 2.

The film package casing 2 is provided with an exposure frame section 20, a film container holding chamber 21, and a film winding chamber 22 disposed on opposite sides of the exposure frame section 20.

The exposure frame section 20 is formed with film guiding and supporting tracks defining a film passage for the photographic film. An exposure opening 23 is formed on a side wall of the exposure frame section 20 facing to the receptacle chamber of the main casing 1. So, the film 42 withdrawn from an outlet 41 of the film container 4 may be extended to the film winding chamber 22 via the film passage defined by the exposure frame section 20.

A downward fork (not shown) is projected from the top wall of the main casing 1 and is rotatable by the film advancing knob 12 so as to rotate the film of the film container 4.

With reference to FIGS. 3 and 4, the film container holding chamber 21 formed in the film package casing 2 of the present invention comprises two opposite curved plates 211 and 212 defining a C-shaped clipping structure and an axially-extending side opening through which a film container 4 may be inserted into the C-shaped clipping structure to be substantially surrounded thereby. The opposite curved plates 211 and 212 are preferably made of a resilient material, capable of securely holding the film container 4 in the film container holding chamber 21.

Preferably, the film container holding chamber 21 comprises a lower supporting plate 213 formed on the lower section of the film container holding chamber 21 for firmly supporting the film container 4 thereon after the film container 4 is held in the film container holding chamber 21. Further, the film container holding chamber 21 preferably comprises an upper supporting plate 214 formed on the upper section of the film container holding chamber.4 for limiting the displacement of the film container 4.

When assembling the film package, a film container 4 is first preloaded into the film container holding chamber 21, and then the film 42 is withdrawn from the film container 4 through the outlet 41 of the film container 4. Thereafter, the film 42 is extended to the film winding chamber 22 via the film passage defined by the exposure frame section 20.

In using the film package thus assembled, when the shutter actuating member 11 is operated, a shutter arranged in the main casing 1 is opened and closed so as to expose a frame of the film 42 placed over the exposure opening 23. After the exposure, the film advancing knob 12 is operated to rotate the fork thereby wind the film by one frame. At the same time, a new frame of the film 42 is advanced to the exposure opening 23 of the exposure frame section 20 for next exposure.

From the above description, it is understood that the present invention provides a recycled photographic film package with a film container holding chamber for a photographic camera. The photographic film package may be preloaded with a film container therein for first use, and it is possible to recycle the photographic film container by simply reloading a new film container.

Although the preferred embodiments of the present invention have been described to illustrate the present invention, it is apparent that changes and modifications in the specifically described embodiments can be carried out without departing from the scope of the invention which is intended to be limited only by the appended claims.

What is claimed is:

1. A film package comprising:

a) a film container containing film therein; and b) a film package casing configured to be removably mounted in a main casing of a camera, the film package casing having: an exposure frame section; an enclosed film winding chamber fixedly located on a first side of the exposure frame section to receive film after the film has passed the exposure frame section; and a film container holding chamber fixedly located on a second side of the exposure frame section opposite from the first side, the film container holding chamber having: a lower supporting plate supporting the film container thereon; an upper supporting plate; and two opposite facing, spaced apart concavely curved resilient plates located between the upper and lower supporting plates and releasably gripping the film container therebetween.

2. The film package of claim 1 further comprising an exposure opening in the exposure frame section.

3. A camera comprising:

a) a main camera casing having a receptacle chamber;

b) a film container containing film therein;

c) a film package casing removably mounted in the receptacle chamber of the main camera casing, the film package casing having: an exposure frame section; an enclosed film winding chamber fixedly located on a first side of the exposure frame section to receive film after the film has passed the exposure frame section; and a film container holding chamber fixedly located on a second side of the exposure frame section opposite from the first side, the film container holding chamber having: a lower supporting plate supporting the film container thereon; an upper supporting plate; and two opposite facing, spaced apart concavely curved resilient plates located between the upper and lower supporting plates and releasably gripping the film container therebetween; and d) a locking member attached to the main camera casing so as to releasably retain the film package casing in the receptacle chamber of the main camera casing.

4. The film package of claim 3 further comprising an exposure opening in the exposure frame section.

* * * * *